Dec. 2, 1958     W. J. QUEMORE, SR     2,862,711
CHILDREN'S AMUSEMENT RIDE
Filed Nov. 8, 1957     2 Sheets-Sheet 1
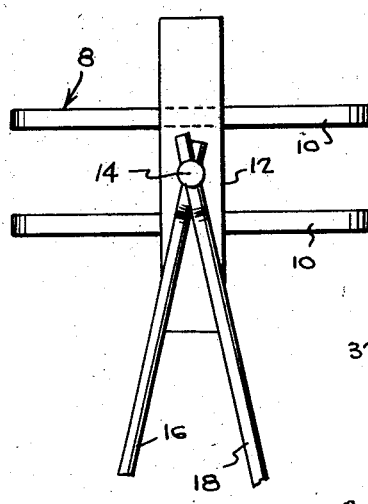
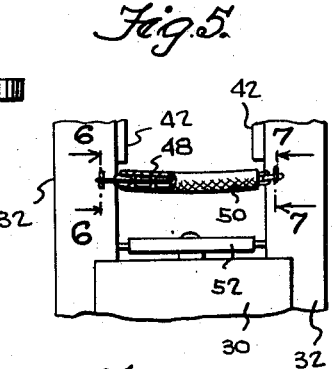
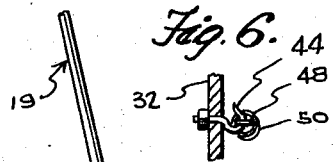
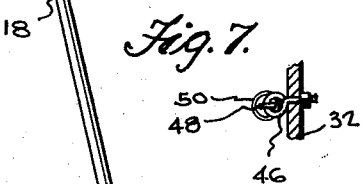
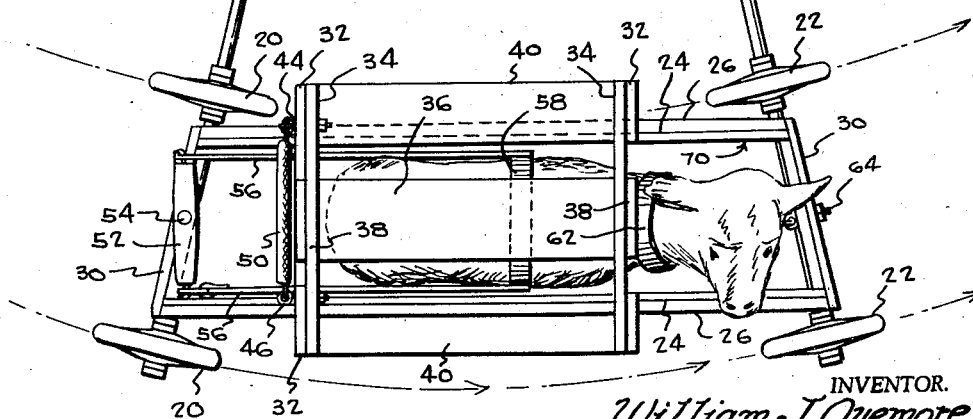
INVENTOR.
William J. Quemore, Sr.
BY
McMorrow, Berman & Davidson
ATTORNEYS Dec. 2, 1958 W. J. QUEMORE, SR 2,862,711
CHILDREN'S AMUSEMENT RIDE
Filed Nov. 8, 1957 2 Sheets-Sheet 2
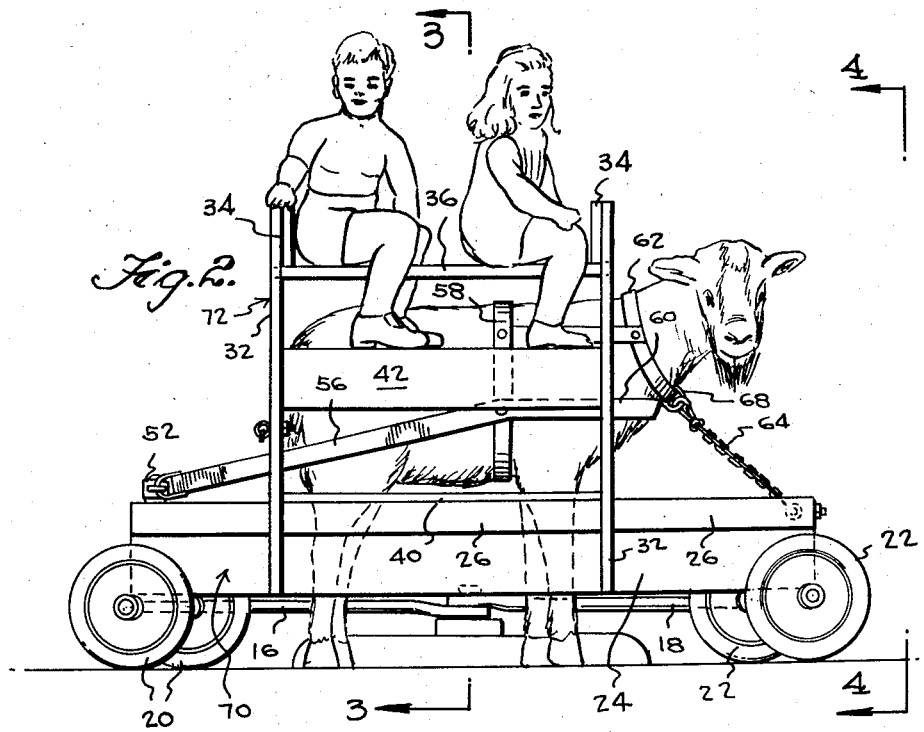
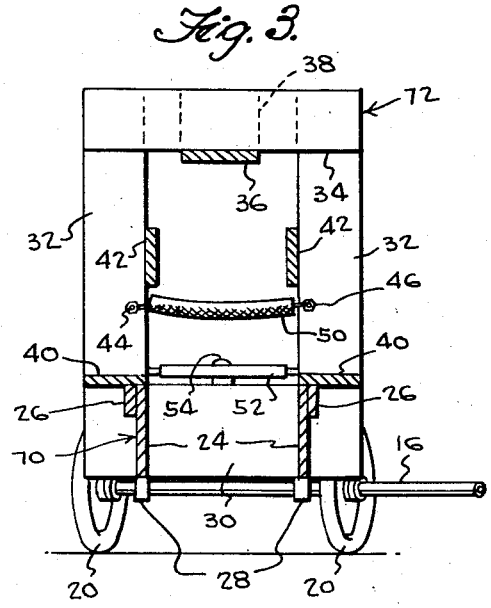
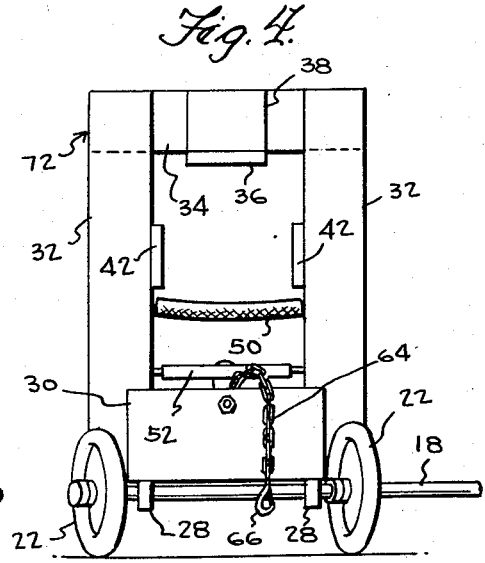
INVENTOR.
William J. Quemore, Sr.
BY
McMorrow, Berman & Davidson
ATTORNEYS

United States Patent Office 2,862,711
Patented Dec. 2, 1958

2,862,711

CHILDREN'S AMUSEMENT RIDE

William J. Quemore, Sr., Blackwood, N. J.

Application November 8, 1957, Serial No. 695,329

3 Claims. (Cl. 272—43)

This invention relates generally to amusement rides for children, and more particularly has reference to a ride of the type known as a roundabout or merry-go-round, wherein the conveyance carrying the child or children travels in a closed circle about an unchanging center.

The main object of the present invention is to provide a generally improved device of the character stated, which will be powered by a live animal such as a goat, pony, large dog, etc.

Summarized briefly, the invention is a wheeled vehicle having a seat extending in a fore-and-aft direction, on which seat as many as four small children may be supported. Below the seat there is an enclosure in which the goat or other draft animal is confined, with the animal being in a harness connected to the vehicle. Front and back wheels of the vehicle are disposed on axes radiating from a common center, and extending as axles for said wheels are elongated, angularly related radius arms extending into convergence at said center, and pivotally connected at their point of convergence to a base. By reason of the arrangement, the animal will move in a circular path about the mentioned center, drawing the vehicle within which the animal is harnessed, thereby providing an amusing ride for the children.

A more specific object of the present invention is to provide a device as stated wherein an animal that is of a size and strength such as would ordinarily prevent it from carrying perhaps one child, is enabled without undue strain upon the animal to carry a number of children, with the children being in effect disposed astride the animal by reason of their being supported upon a seat that is spaced upwardly perhaps no more than a few inches from the animal's back.

Another object is to provide a vehicle as stated that will be capable of manufacture at relatively low cost, and which will be rugged and trouble-free in operation.

Yet another object is to facilitate the harnessing of the animal within the device with the animal-enclosing portions defining ladder-like steps that facilitate mounting and dismounting.

Yet another object is to design a structure of the character stated in such a way that a number of devices could travel about a common center, and could be so connected that a single animal or perhaps a pair of the animals can impart movement to a group of the vehicles exceeding in number the number of animals.

A further object is to provide a children's amusement ride as stated that will be completely safe in operation, in that the children are protected from unruly activities on the part of the animal, with the animal being, in actuality, prevented from rearing and bucking, and from other actions that might tend to create a hazard for the riders.

Still another object is to so form the device that the animal will be required to move at a speed which will not be so high as to frighten or endanger the children.

Other objects will appear from the following description, the claims appended thereto, and from the annexed drawing, in which like reference characters designate like parts throughout the several views, and wherein:

Figure 1 is a top plan view of the device with the animal harnessed therein, a portion of the arm assembly being broken away;

Figure 2 is a side elevational view of the device, as it appears when in use;

Figure 3 is a transverse sectional view substantially on line 3—3 of Figure 2;

Figure 4 is a front elevational view of the device as seen from the line 4—4 of Figure 2.

Figure 5 is a fragmentary, detail view of the device partly in rear elevation and partly in section;

Figure 6 is an enlarged, detail sectional view on line 6—6 of Figure 5; and

Figure 7 is an enlarged, detail sectional view on line 7—7 of Figure 5.

Referring to the drawing in detail, a stationary base generally designated 8 includes parallel, elongated support bars 10, underlying and extending in perpendicular relation to a cross bar 12 fixedly secured to the bars 10. Projecting upwardly from cross bar 12 is a center pin 14, passing through aligned openings of the convergent ends of a pair of radius arms 16, 18 disposed at an acute angle to each other and constituting an arm assembly generally designated 19.

The outer ends of arms 16, 18 constitute angularly related axles for rear wheels 20 and front wheels 22. Referring to Figures 2 and 3, elongated, parallel, horizontally disposed longitudinal or side frame members 24 have their end portions in overlying relation to the respective axles, said end portions being provided with bearings 28 receiving the respective axles. The side frame members 24, along their upper longitudinal edge portions, are fixedly secured to reinforcing members 26 each of which extends the full length of its associated members 24.

At its opposite ends, the vehicle includes end plates 30 each of which is fixedly connected to and extended between the adjacent ends of the respective side members 24. The members 30 are in parallel relation to the respective axles, that is, said members 30, as clearly shown in Figure 1, are in convergent relation in a direction toward the center 14 about which the vehicle travels.

Fixedly secured to the respective members 24, 26 are vertically, upwardly extending seat support members 32. There are two pairs of members 32, as clearly shown in Figure 1, each pair being spaced inwardly a short distance from its adjacent pair of ground wheels. The members of each pair are aligned transversely of the vehicle, and fixedly connected between the upper ends of the members of each pair are transverse seat support members 34, between which an elongated seat board 36 extends in a fore-and-aft direction. The ends of the seat board underlie and are fixedly connected to the members 34, and reinforcing the connection are end pieces 38 connected fixedly to the seat board and to the transverse members 34.

Since, as shown in Figure 2, small children are seated upon the board 36, means is provided to aid the children in mounting and dismounting. Thus, lying in a common horizontal plane and extending along opposite sides of the animal-receiving portion of the device are longitudinal mounting boards 40. These may also serve as means on which the children may stand, during movement of the vehicle. Spaced upwardly from the mounting boards 40 are side panels 42, connected between the members 32 at each side of the device, to provide foot rests for the children (see Figure 2) while also cooperating with the adjacent components of the structure in confining the animal.

The animal enters the device from the rear, that is, the animal moves into the position shown in Figures 1 and 2 through the space between the rear members 32. A gate or rear strap is provided, which is removed when the animal is entering the device, but which is thereafter connected across the space between the rear members 32 to confine the animal. Said rear gate is connected to a hook 44 and an eye 46 connected to the respective rear members 32. A chain 48 is permanently connected to the eye 46, and extends through a protective hose or sleeve 50, with the other end of the chain being detachably connected to the hook 44 (see Figures 6 and 7).

A singletree 52 is pivoted to swing about a vertical axis intermediate the ends of the singletree upon a pin 54 carried by the rear end plate 30. Connected to the ends of the singletree are traces 56, which at their forward ends are connected to a harness that includes a belly strap 58, a breast strap 60 and a collar 62.

A back-up chain 64 is connected to the front end plate 30 as shown in Figure 4, and has a snap hook 66 which is detachably connectable to an eye 68 provided upon the collar 62.

It will be seen that the device includes an open-center, elongated, horizontally disposed main frame generally designated 70 and comprising the longitudinal members 24 and the end plates 30, together with the longitudinal reinforcing members 26. The device further includes the arm assembly 19, and the ground wheels 20, 22 so related to the frame 70 that the frame is rollably mounted to travel in a closed circular path about the center 14. The main frame is proportioned to constitute an enclosure for a draft animal, and bridging said enclosure is a rider support structure generally designated 72. It will be noted that the structure 72 comprises a pair of transversely disposed support frames of inverted U shape each of which includes a pair of the members 32 and the transverse member 34 connected between said members 32. Structure 72 further includes a seat board, side panels 42, and mounting boards 40 all extending longitudinally of the device between the frames of the support structure 72 and cooperating with said frames in defining a bridge-like enclosure in which the animal is harnessed.

A device formed as illustrated and described is designed to permit a number of the children to be supported, in close proximity to and astride the animal's back, thereby adding to a considerable extent to the amusement derived from the device. Further, the device has the desirable characteristic of being remarkably free from danger, since the animal is securely maintained against rearing, bucking, galloping, etc. Still further, the support structure 72 extends as a protector between the children and the animal.

In the illustrated example, a single draft animal and a single vehicle are shown. However, it is quite possible that a number of the vehicles may be joined together at locations angularly spaced about the center 14 for travel in a common circular path about said center. For example, two of the vehicles may be disposed diametrically opposite each other, with arms 16, 18 extending diametrically of the circular path and being connected to the pin 14 at their point of crossing. A single animal may thus cause both vehicles to move in the mentioned circular path. Additional vehicles, and of course additional draft animals, can be incorporated in a single assembly to provide a roundabout or merry-go-round that is highly amusing to the children, has a particularly high capacity, is devoid of engines or equivalent means, is safe to use, and is designed to permit an animal ordinarily too small to support even one child to provide a ride for a number of children without undue strain.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. An amusement ride comprising a base; an arm assembly pivotally connected at one end to and extending radially from the base, said assembly including front and rear axles disposed radially of the pivotal connection of the arm assembly to the base; and a vehicle connected to said axles and proportioned to serve simultaneously as an enclosure for a draft animal and as a support for at least one rider, said vehicle including front and rear wheels carried by the respective axles for rotation of each wheel in a plane normal to a radius of said pivotal connection, said vehicle further including an open-center frame elongated in a fore-and-aft direction with its ends overlying and connected to the respective axles, said frame being adapted to extend as an enclosure for the draft animal, said vehicle further including a pair of support frames of inverted U shape, carried by and spaced longitudinally of the first named frame, and a seat board connected between the upper ends of said last named frames, said last named frames being proportioned to bridge the confined animal with the seat board in close proximity to the back of the animal.

2. An amusement ride comprising a base; an arm assembly pivotally connected at one end to and extending radially from the base, said assembly including front and rear axles disposed radially of the pivotal connection of the arm assembly to the base; and a vehicle connected to said axles and proportioned to serve simultaneously as an enclosure for a draft animal and as a support for at least one rider, said vehicle including front and rear wheels carried by the respective axles for rotation of each wheel in a plane normal to a radius of said pivotal connection, said vehicle further including an open-center frame elongated in a fore-and-aft direction with its ends overlying and connected to the respective axles, said frame being adapted to extend as an enclosure for the draft animal, said vehicle further including a pair of support frames of inverted U shape, carried by and spaced longitudinally of the first named frame, and a seat board connected between the upper ends of said last named frames, said last named frames being proportioned to bridge the confined animal with the seat board in close proximity to the back of the animal, said vehicle additionally including side panels connected between the respective sides of the last named frames to serve as foot rests and as restraining board extending along opposite sides of the confined animal.

3. An amusement ride comprising a base; an arm assembly pivotally connected at one end to and extending radially from the base, said assembly including front and rear axles disposed radially of the pivotal connection of the arm assembly to the base; and a vehicle connected to said axles and proportioned to serve simultaneously as an enclosure for a draft animal and as a support for at least one rider, said vehicle including front and rear wheels carried by the respective axles for rotation of each wheel in a plane normal to a radius of said pivotal connection, said vehicle further including an open-center frame elongated in a fore-and-aft direction with its ends overlying and connected to the respective axles, said frame being adapted to extend as an enclosure for the draft animal, said vehicle further including a pair of support frames of inverted U shape, carried by and spaced longitudinally of the first named frame, and a seat board connected between the upper ends of said last named frames, said last named frames being proportioned to bridge the confined animal with the seat board in close proximity to the back of the animal, said vehicle additionally including side panels connected between the respective sides of the last named frames to serve as foot rests and as restraining boards extending along opposite sides of the confined animal, and a pair of mounting boards disposed in a common horizontal plane and supported upon opposite sides of the first named frame.

References Cited in the file of this patent
UNITED STATES PATENTS

| | | |
|---|---|---|
| 229,541 | Magner | July 6, 1880 |
| 667,678 | Craig | Feb. 12, 1901 |